(12) United States Patent
Acosta-Cazaubon et al.

(10) Patent No.: US 8,500,013 B2
(45) Date of Patent: Aug. 6, 2013

(54) SYSTEMS AND METHODS FOR ACCESSING CHARGING CAPABILITIES OF ELECTRIC VEHICLE CHARGING STATIONS

(75) Inventors: Jesus Acosta-Cazaubon, Atlanta, GA (US); George Alexander, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 13/213,747

(22) Filed: Aug. 19, 2011

(65) Prior Publication Data

US 2013/0043306 A1    Feb. 21, 2013

(51) Int. Cl.
*G06K 7/00* (2006.01)

(52) U.S. Cl.
USPC ............. 235/382; 235/375; 235/380; 705/5; 705/35

(58) Field of Classification Search
USPC ............ 235/375, 379, 380, 435, 439, 454, 235/462
See application file for complete search history.

(56) References Cited

U.S. PATENT DOCUMENTS

| | | |
|---|---|---|
| 5,270,522 A | 12/1993 | Bone, Jr. |
| 5,559,894 A | 9/1996 | Lubliner et al. |
| 5,870,140 A | 2/1999 | Gillberry |
| 5,926,015 A | 7/1999 | Pharr |
| 6,512,919 B2 | 1/2003 | Ogasawara |
| 6,529,883 B1 | 3/2003 | Yee et al. |
| 7,379,791 B2 | 5/2008 | Tamarkin et al. |
| 2003/0120442 A1 * | 6/2003 | Pellegrino et al. ............... 702/60 |
| 2004/0034603 A1 | 2/2004 | Hastings et al. |
| 2004/0059585 A1 | 3/2004 | Villicana et al. |
| 2004/0249655 A1 | 12/2004 | Doeberl et al. |
| 2006/0237530 A1 | 10/2006 | Elliot et al. |
| 2006/0259866 A1 | 11/2006 | Prasad et al. |
| 2007/0022058 A1 | 1/2007 | Labrou et al. |
| 2007/0138253 A1 * | 6/2007 | Libin et al. .................... 235/375 |
| 2008/0079374 A1 | 4/2008 | Wobben |
| 2009/0144164 A1 | 6/2009 | Wane et al. |
| 2009/0281904 A1 * | 11/2009 | Pharris ........................... 705/17 |
| 2009/0288012 A1 | 11/2009 | Hertel et al. |
| 2010/0012406 A1 | 1/2010 | Kressner et al. |
| 2011/0035510 A1 | 2/2011 | Alexander |
| 2011/0208658 A1 | 8/2011 | Makhotin |

* cited by examiner

*Primary Examiner* — Michael G Lee
*Assistant Examiner* — Matthew Mikels
(74) *Attorney, Agent, or Firm* — Sutherland Asbill & Brennan LLP

(57) ABSTRACT

Embodiments of the invention can provide systems and methods for accessing charging capabilities of electric vehicle charging stations. According to one embodiment of the invention, a system can be provided. The system can include a computer processor. The system can also include a memory operable to store computer-executable instructions operable to receive a readable code associated with an electric vehicle charging station, and further receive a unique identifier associated with a mobile device; and based at least in part on the readable code and unique identifier, authorize a consumer associated with the mobile device to access charging capabilities associated with the electric vehicle charging station.

20 Claims, 4 Drawing Sheets

SYSTEMS AND METHODS FOR ACCESSING CHARGING CAPABILITIES OF ELECTRIC VEHICLE CHARGING STATIONS

FIELD OF THE INVENTION

Embodiments of the invention relate generally to electric vehicle charging stations, and more particularly to systems and methods for accessing charging capabilities of electric vehicle charging stations.

BACKGROUND OF THE INVENTION

Electric vehicle charging stations are typically used to provide charging points for electric vehicles or hybrid electric vehicles. As electric vehicle and hybrid electric vehicle usage increases, controlled access to the charging capabilities of electric vehicle charging stations may be needed.

BRIEF DESCRIPTION OF THE INVENTION

Some or all of the above needs and/or problems may be addressed by certain embodiments of the invention. Disclosed embodiments may include systems and methods for accessing charging capabilities of electric vehicle charging stations. According to one embodiment of the invention, there is disclosed a method for accessing charging capabilities of electric vehicle charging stations. The method can include registering a unique identifier of a mobile device with an electric vehicle charging station operator; transmitting a readable code to the electric vehicle charging station operator with the mobile device, wherein the readable code is associated with a particular electric vehicle charging station having a readable code; and receiving an indication that a consumer associated with the unique identifier of the mobile device can access charging capabilities associated with the electric vehicle charging station.

According to another embodiment of the invention, there is disclosed another method for accessing charging capabilities of electric vehicle charging stations. The method can include associating a consumer with a mobile device, wherein the mobile device comprises a unique identifier; associating the electric vehicle charging station with a particular readable code; receiving communications from the mobile device, wherein the communications comprise the readable code associated with the particular electric vehicle charging station having the readable code, and wherein the communications further comprise the unique identifier associated with the mobile device; and verifying a consumer associated with the unique identifier of the mobile device can access charging capabilities associated with the electric vehicle charging station.

Further, according to another embodiment of the invention, there is disclosed a system for accessing charging capabilities of an electric vehicle charging station. The system can include a computer processor. The system can also include a memory operable to store computer-executable instructions operable to receive a readable code associated with an electric vehicle charging station, and further receive a unique identifier associated with a mobile device; and based at least in part on the readable code and unique identifier, authorize a consumer associated with the mobile device to access charging capabilities associated with the electric vehicle charging station.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
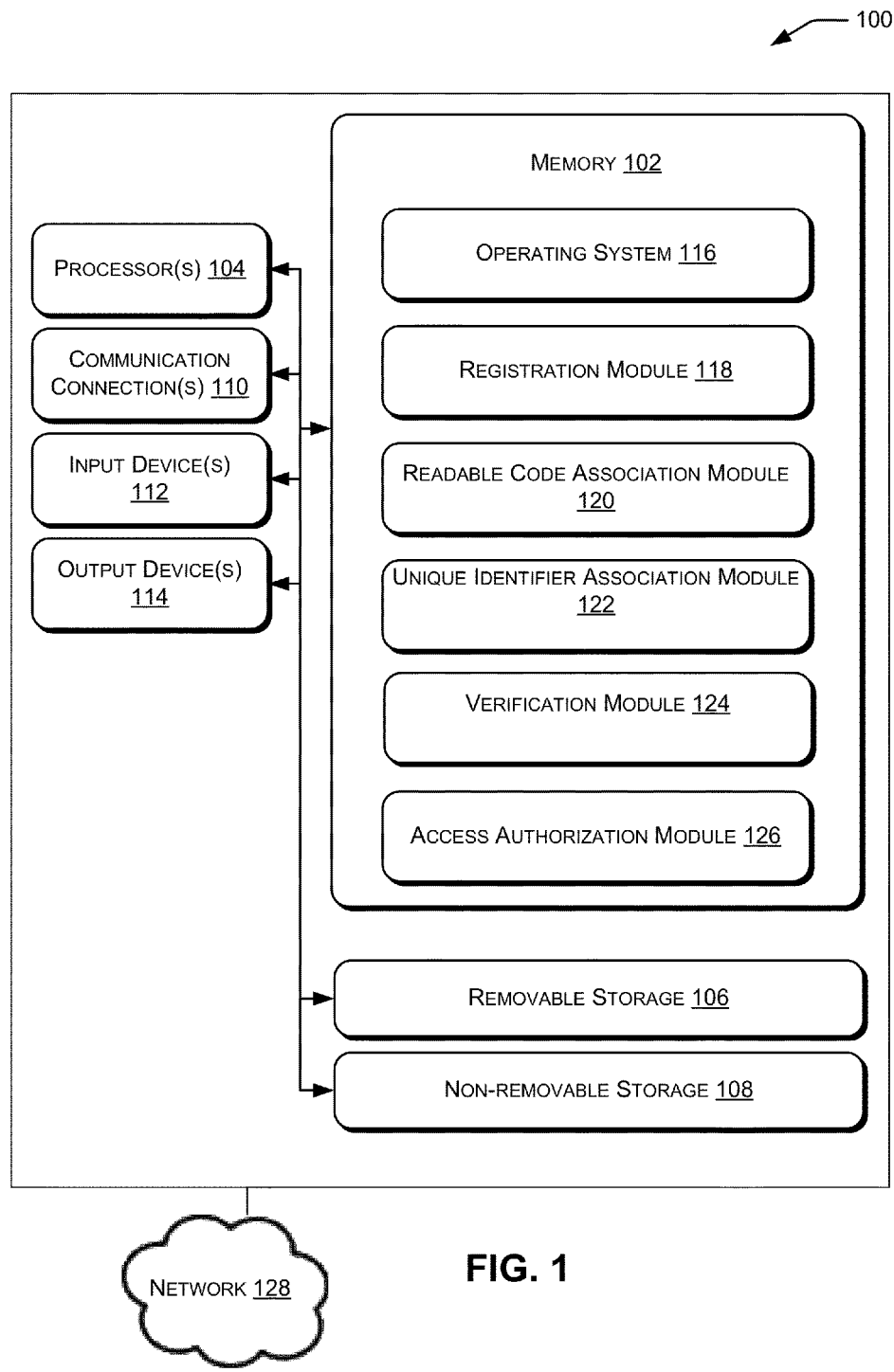
FIG. 1 is a block diagram of a computer environment showing an illustrative system for accessing charging capabilities of an electric vehicle charging station, according to an embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Like numbers refer to like elements throughout.

Illustrative embodiments of the invention are directed to, among other things, systems and methods for accessing charging capabilities of electric vehicle charging stations. Certain embodiments of the invention may be directed towards verifying that a consumer associated with a unique identifier of a mobile device can access charging capabilities associated with an electric vehicle charging station. For example, the unique identifier of the mobile device may be registered with an electric vehicle charging station operator. The electric vehicle charging station operator may then associate the unique identifier of the mobile device with a consumer authorized to access charging capabilities of the electric vehicle charging station. The mobile device may transmit the unique identifier of the mobile device and a readable code of the electric vehicle charging station to the electric vehicle charging station operator. The electric vehicle charging station operator may then verify that a consumer associated with the unique identifier of the mobile device can access charging capabilities associated with the electric vehicle charging station. Upon verification, the consumer may be granted access to the charging capabilities of the electric vehicle charging station.

In some embodiments, a consumer may register a unique identifier of a mobile device with an electric vehicle charging station operator; transmit a readable code to the electric vehicle charging station operator with the mobile device, wherein the readable code is associated with a particular electric vehicle charging station having a readable code; and receive an indication that a consumer associated with the unique identifier of the mobile device can access charging capabilities associated with the electric vehicle charging station.

Further, in some embodiments, an electric vehicle charging station operator may associate a consumer with a mobile device, wherein the mobile device comprises a unique identifier; associate the electric vehicle charging station with a particular readable code; receive communications from the mobile device, wherein the communications comprise the readable code associated with the particular electric vehicle charging station having the readable code, and wherein the communications further comprise the unique identifier associated with the mobile device; and verify a consumer associated with the unique identifier of the mobile device can access charging capabilities associated with the electric vehicle charging station.

In some aspects, the unique identifier of the mobile device may be a media access control address. In other aspects, the readable code may be a quick response (QR) code, a bar code, or an encrypted identification code. In still other aspects, the mobile device may be a smartphone, a mobile phone, a tablet device, or a handheld communication device. In other aspects, some or all communication may be performed on a secure platform.

Certain embodiments of the invention can provide a technical solution to facilitating access to charging capabilities of an electric vehicle charging station. In one embodiment, a unique identifier for a mobile device associated with a consumer, and a readable code for a electric vehicle charging station, can be associated together for purposes of authorizing a consumer's access to charging capabilities managed by the electric vehicle charging station. In this manner, certain embodiments of the invention can encourage and facilitate access to charging capabilities of an electric vehicle charging station.

FIG. 1 provides an illustrative overview of a system, such as one computing device 100, according to an embodiment of the invention. The computing device 100 may be configured as any suitable computing device capable of implementing the disclosed features, and accompanying methods, such as, but not limited to, those described with reference to FIG. 1. By way of example and not limitation, suitable computing devices may include personal computers (PCs), servers, server farms, data centers, or any other device capable of storing and executing all or part of the disclosed features.

In one illustrative configuration, the computing device 100 comprises at least a memory 102 and one or more processing units (or processor(s)) 104. The processor(s) 104 may be implemented as appropriate in hardware, software, firmware, or combinations thereof. Software or firmware implementations of the processor(s) 104 may include computer-executable or machine-executable instructions written in any suitable programming language to perform the various functions described. Moreover, the processor 104 may be associated with a network, a server, a computer or a mobile device.

Memory 102 may store program instructions that are loadable and executable on the processor(s) 104, as well as data generated during the execution of these programs. Depending on the configuration and type of computing device 100, memory 102 may be volatile (such as random access memory (RAM)) and/or non-volatile (such as read-only memory (ROM), flash memory, etc.). The computing device or server may also include additional removable storage 106 and/or non-removable storage 108 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 102 may include multiple different types of memory, such as static random access memory (SRAM), dynamic random access memory (DRAM), or ROM.

Memory 102, removable storage 106, and non-removable storage 108 are all examples of computer-readable storage media. For example, computer-readable storage media may include volatile and non-volatile, removable and non-removable media implemented in any method or technology for storage of information such as computer-readable instructions, data structures, program modules or other data. Memory 102, removable storage 106, and non-removable storage 108 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the server or other computing device. Combinations of any of above should also be included within the scope of computer-readable media.

Alternatively, computer-readable communication media may include computer-readable instructions, program modules, or other data transmitted within a data signal, such as a carrier wave, or other transmission.

The computing device 100 may also contain communication connection(s) 110 that allow the computing device 100 to communicate with a stored database, another computing device or server, user terminals, and/or other devices on a network 128. The computing device 100 may also include input device(s) 112 such as a keyboard, mouse, pen, voice input device, touch input device, etc., and output device(s) 114, such as a display, speakers, printer, etc.

Turning to the contents of the memory 102 in more detail, the memory 102 may include an operating system 116 and one or more application programs or services for implementing the features disclosed herein including a registration module 118. The registration module 118 may be configured to receive data regarding a unique identifier associated with a mobile device, such as, but not limited to, a media access control (MAC) address. Additionally, the registration module 118 may store the unique identifier associated with the mobile device in the memory 102. In one aspect, the registration module 118 may receive the unique identifier associated with the mobile device through a website, kiosk, or other portal or network 126 accessible to the computing device 100.

The memory 102 may also include a readable code association module 120. The readable code association module 120 may be configured to associate a readable code with an electric vehicle charging station. The readable code association module 120 may also store the readable code associated with the electric vehicle charging station in the memory 102.

The memory 102 may further include a unique identifier association module 122. The unique identifier association module 122 may be configured to associate a unique identifier of a mobile device, as registered in registration module 118, with a consumer having access to charging capabilities associated with an electric vehicle charging station. The unique identifier association module 122 may also store the unique identifier of a mobile device associated with the consumer in the memory 102.

Additionally, the memory 102 may include a verification module 124. The verification module 124 may be configured to verify that a unique identifier of a mobile device, as registered in registration module 118, is associated with a consumer having access to charging capabilities associated with an electric vehicle charging station, as associated in unique identifier association module 122.

The memory 102 may also include an access authorization module 126. The access authorization module 126 may be configured to provide access to charging capabilities associated with an electric vehicle charging station upon verification in unique identifier verification module 124.

Various instructions, methods and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example computing device 100 shown in FIG. 1 is provided by way of example only. Numerous other operating environments, system architectures, and device configurations are possible. Accordingly, embodiments of the present disclosure should not be construed as being limited to any particular operating environment, system architecture, or device configuration.

Figure 2:
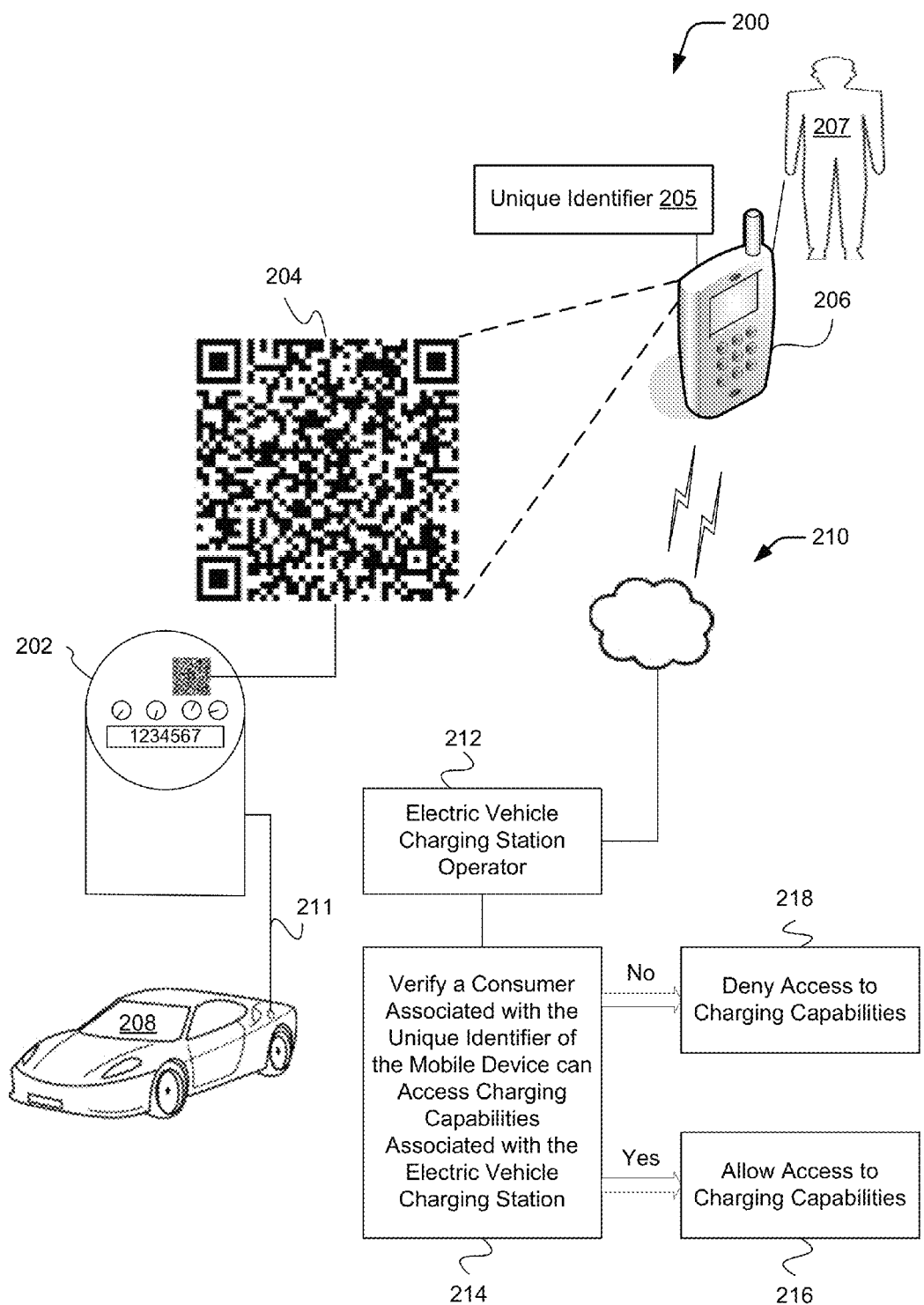
FIG. 2 is a schematic illustrating details of an example data flow for accessing charging capabilities of an electric vehicle charging station, according to an embodiment of the invention.

FIG. 2 is a schematic illustrating details of an example data flow 200 for facilitating access to charging capabilities of an electric vehicle charging station. The example data flow 200 utilizes an electric vehicle charging station 202, a readable code 204 associated with the electric vehicle charging station 202, and a mobile device 206 for providing access to the charging capabilities 211 of the electric vehicle charging station 202. In one aspect, the data flow 200 can facilitate verifying that a consumer 207 associated with a unique identifier 205 of the mobile device 206 can access charging capabilities 211 associated with the electric vehicle charging station 202.

The data flow 200 begins by a consumer, such as 207, using a mobile device, such as 206, to scan a readable code 204 of the electric vehicle charging station 202. The mobile device 206 can receive the readable code 204 or otherwise transmit the readable code 204 via a network 216 to a server or other processor-based device, such as a server at the electric vehicle charging station operator 208. The server at the electric vehicle charging station operator 208 can verify that the unique identifier 205 of the mobile device 206 is associated with a consumer 207 having access to charging capabilities 211 associated with the electric vehicle charging station 202. In the particular implementation shown in FIG. 2, the readable code 204 can be a quick response (QR) code, the unique identifier 205 of the mobile device 206 can be a media access control (MAC) address, and the mobile device 206 can be a smartphone. One may appreciate, however, that any readable code may be used, including, but not limited to, a bar code or an encrypted identification code. One may also appreciate that any unique identifier may be used, including, but not limited to, a phone number or IP address. One may further appreciate that any mobile device may be used, including, but not limited to, a mobile phone, a tablet device, or a handheld communication device.

Still referring to FIG. 2, in one aspect, the readable code 204 may be disposed on or about the electric vehicle charging station 202. The mobile device 206 may scan the readable code 204 using a camera or other device capable of reading, sensing, detecting, or receiving a code. The unique identifier 205 of the mobile device 206 and the readable code 204 of the electric vehicle charging station 202 are transmitted 210 to an electric vehicle charging station operator 212. The electric vehicle charging station operator 212 may then verify 214 that the unique identifier of the mobile device 206 is associated with a consumer having access to charging capabilities of the electric vehicle charging station 202. Upon verification, access may be granted 216 to the charging capabilities of the electric vehicle charging station 202. Upon receiving access, an electric vehicle 208 may be charged using the charging capabilities 211 of the electric vehicle charging station 202. Conversely, if the unique identifier 205 of the mobile device 206 is not associated with a consumer 207 having access to charging capabilities 211 of the electric vehicle charging station 202, access to the utility account is denied 218.

Figure 3:
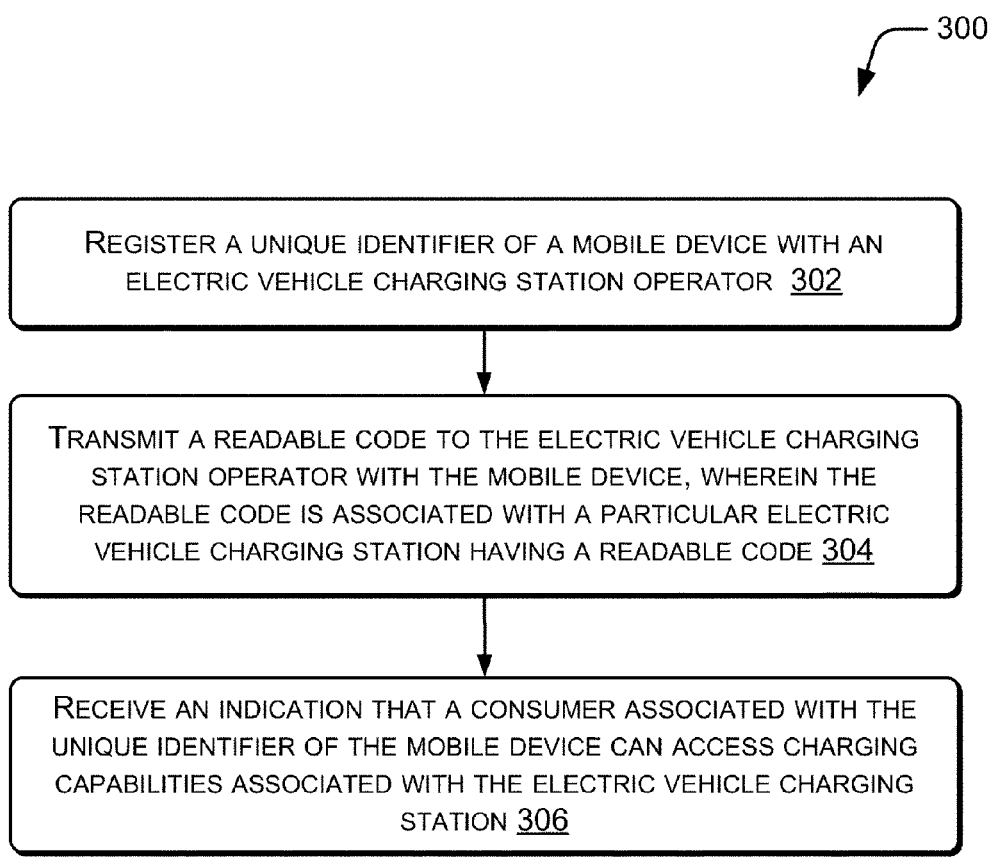
FIG. 3 is a flow diagram illustrating details of an example method for accessing charging capabilities of an electric vehicle charging station, according to an embodiment of the invention.

FIG. 3 illustrates an example flow diagram of a method 300 for implementing other aspects for accessing charging capabilities of electric vehicle charging stations, as discussed above. In one example, the illustrative computing device 100 of FIG. 1 and/or one or more modules of the illustrative computing device 100, alone or in combination, may perform the described operations of method 300.

In this particular implementation, the method 300 may begin at block 302 of FIG. 3 in which the method 300 can include the registration of a unique identifier of a mobile device with an electric vehicle charging station operator. Further, at block 304, the method 300 can include transmitting a readable code to the electric vehicle charging station operator with the mobile device, wherein the readable code is associated with a particular electric vehicle charging station having a readable code. At block 306, the method 300 can include receiving an indication that a consumer associated with the unique identifier of the mobile device can access charging capabilities associated with the electric vehicle charging station.

Figure 4:
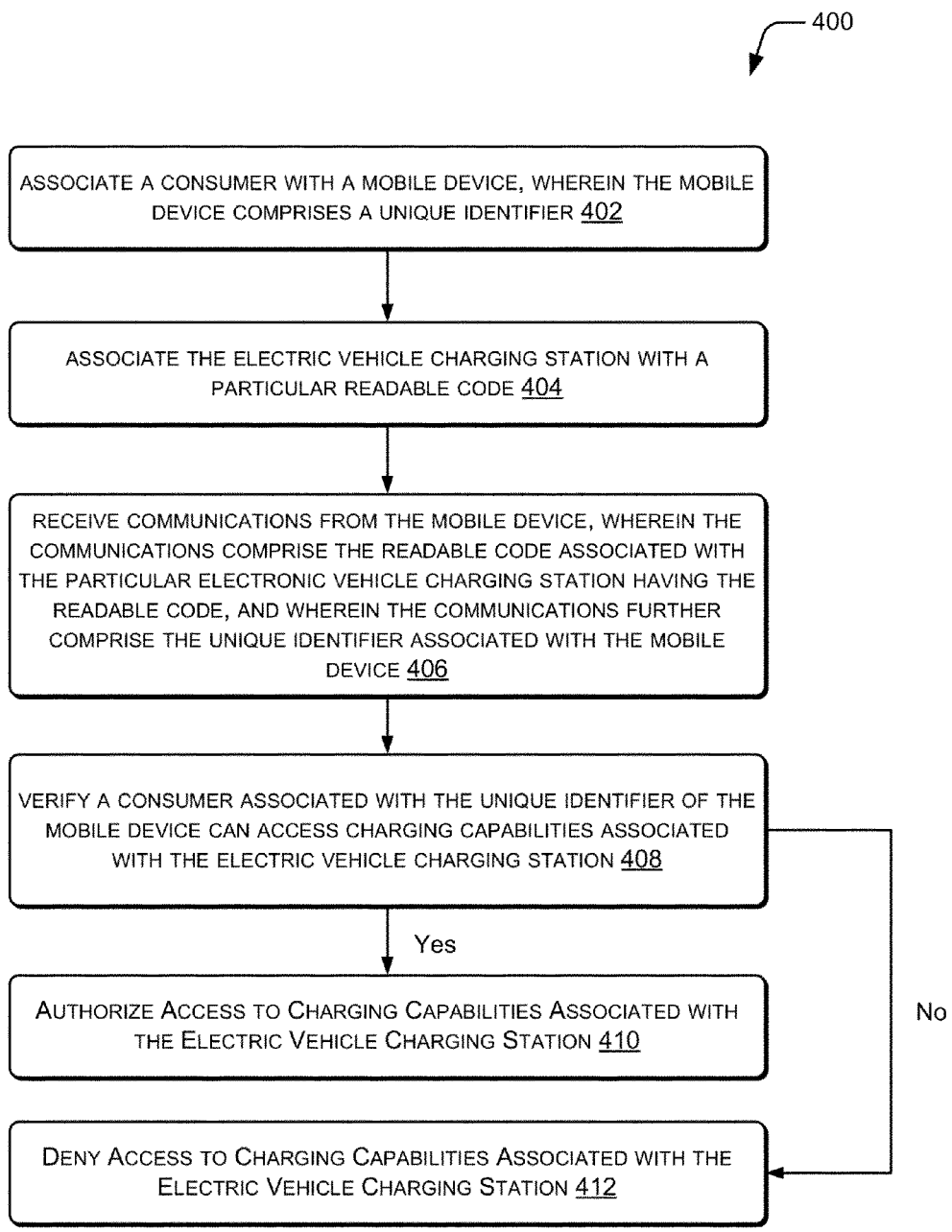
FIG. 4 is a flow diagram illustrating details of another example method for accessing charging capabilities of an electric vehicle charging station, according to an embodiment of the invention.

FIG. 4 illustrates another example flow diagram of a method 400 for implementing other aspects for accessing charging capabilities of electric vehicle charging stations, as discussed above. In one example, the illustrative computing device 100 of FIG. 1 and/or one or more modules of the illustrative computing device 100, alone or in combination, may perform the described operations of method 400.

In this particular implementation, the method 400 may begin at block 402 of FIG. 4 in which the method 400 can include associating a consumer with a mobile device, wherein the mobile device comprises a unique identifier. Further, at block 404, the method 400 can include associating an electric vehicle charging station with a particular readable code. At block 406, the method 400 can include receiving communications from the mobile device, wherein the communications comprise the readable code associated with the particular electric vehicle charging station having the readable code, and wherein the communications further comprise the unique identifier associated with the mobile device. Moreover, at block 408, the method 400 can include verifying a consumer associated with the unique identifier of the mobile device can access charging capabilities associated with the electric vehicle charging station. Upon verification, at block 410, the consumer may be granted access to the charging capabilities of the electric vehicle charging station. Once a consumer is granted access to the charging capabilities of the electric vehicle charging station, the consumer can charge an electric vehicle. Conversely, at block 412, if the unique identifier of the mobile device is not associated with a consumer having access to charging capabilities of the electric vehicle charging station, access is denied to the charging capabilities of the electric vehicle charging station.

Illustrative systems and methods are described for providing access to a consumer utility account by verifying that the readable code of the utility meter is associated with a unique identifier of the mobile device. Some or all of these systems and methods may, but need not, be implemented at least partially by architectures such as those shown in FIG. 1 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A method for accessing charging capabilities of electric vehicle charging stations, comprising:
   registering a unique identifier of a mobile device with an electric vehicle charging station operator;
   transmitting a readable code to the electric vehicle charging station operator with the mobile device, wherein the readable code is associated with a particular electric vehicle charging station having a readable code; and
   receiving an indication that a consumer associated with the unique identifier of the mobile device can access charging capabilities associated with the electric vehicle charging station.

2. The method of claim 1, further comprising:
   upon or after receipt of the indication, authorizing charging of an electric vehicle.

3. The method of claim 1, wherein the unique identifier of the mobile device is a media access control address.

4. The method of claim 1, wherein the readable code comprises a quick response (QR) code, a bar code, or an encrypted identification code.

5. The method of claim 1, wherein the mobile device is a smartphone, a mobile phone, a tablet device, or a handheld communication device.

6. The method of claim 1, wherein registering, transmitting, and receiving are performed using communications via a secure platform.

7. A method for accessing charging capabilities of electric vehicle charging stations, comprising:
   associating a consumer with a mobile device, wherein the mobile device comprises a unique identifier;
   associating an electric vehicle charging station with a particular readable code;
   receiving communications from the mobile device, wherein the communications comprise the readable code associated with the electric vehicle charging station having the readable code, and wherein the communications further comprise the unique identifier associated with the mobile device; and
   verifying the consumer associated with the unique identifier of the mobile device can access charging capabilities associated with the electric vehicle charging station.

8. The method of claim 7, further comprising:
   upon or after verifying the consumer associated with the unique identifier of the mobile device can access charging capabilities associated with the electric vehicle charging station, authorizing charging of an electric vehicle by the electric vehicle charging station.

9. The method of claim 8, further comprising:
   upon or after allowing access to charging capabilities associated with the electric vehicle charging station, billing the consumer.

10. The method of claim 7, wherein the unique identifier of the mobile device is a media access control address.

11. The method of claim 7, wherein the readable code comprises a quick response (QR) code, a bar code, or an encrypted identification code.

12. The method of claim 7, wherein the mobile device comprises a smartphone, a mobile phone, a tablet device, or a handheld communication device.

13. The method of claim 7, wherein the communications are performed via a secure platform.

14. A system for accessing charging capabilities of electric vehicle charging stations, comprising:
   a computer processor; and
   a memory operable to store computer-executable instructions operable to:
      receive a readable code associated with an electric vehicle charging station, and further receive a unique identifier associated with a mobile device; and
      based at least in part on the readable code and unique identifier, authorize a consumer associated with the mobile device to access charging capabilities associated with the electric vehicle charging station.

15. The system of claim 14, wherein the computer processor is associated with a server or a computer.

16. The system of claim 14, wherein the computer processor is associated with the mobile device.

17. The system of claim 14, wherein the unique identifier of the mobile device is a media access control address.

18. The system of claim 14, wherein the readable code comprises a quick response (QR) code, a bar code, or an encrypted identification code.

19. The system of claim 14, wherein the mobile device comprises a smartphone, a mobile phone, a tablet device, or a handheld communication device.

20. The method of claim 14, wherein all communications are performed via a secure platform.

* * * * *

UNITED STATES PATENT AND TRADEMARK OFFICE
CERTIFICATE OF CORRECTION

PATENT NO. : 8,500,013 B2
APPLICATION NO. : 13/213747
DATED : August 6, 2013
INVENTOR(S) : Acosta-Cazaubon et al.

It is certified that error appears in the above-identified patent and that said Letters Patent is hereby corrected as shown below:

In the Specification

In Column 3, Line 24, delete "for a electric vehicle" and insert -- for an electric vehicle --, therefor.

In Column 4, Line 47, delete "network 126" and insert -- network 128 --, therefor.

In Column 5, Lines 46-47, delete "electric vehicle charging station operator 208." and insert -- electric vehicle charging station operator 212. --, therefor.

In Column 5, Lines 47-48, delete "electric vehicle charging station operator 208" and insert -- electric vehicle charging station operator 212 --, therefor.

In the Claims

In Column 8, Line 50, in Claim 20, delete "The method" and insert -- The system --, therefor.

Signed and Sealed this
Twelfth Day of August, 2014

Michelle K. Lee
*Deputy Director of the United States Patent and Trademark Office*